(12) United States Patent
Cicala

(10) Patent No.: US 8,246,101 B2
(45) Date of Patent: Aug. 21, 2012

(54) FLUSH DROP-GLASS WINDOW MODULE

(75) Inventor: Robert John Cicala, Rochester Hills, MI (US)

(73) Assignee: Dura Global Technologies, LLC, Auburn Hills, MI (US)

( * ) Notice: Subject to any disclaimer, the term of this patent is extended or adjusted under 35 U.S.C. 154(b) by 456 days.

(21) Appl. No.: 12/186,177

(22) Filed: Aug. 5, 2008

(65) Prior Publication Data

US 2009/0113802 A1   May 7, 2009

Related U.S. Application Data

(60) Provisional application No. 60/984,783, filed on Nov. 2, 2007.

(51) Int. Cl.
*B60J 1/18* (2006.01)

(52) U.S. Cl. ............ 296/146.16; 296/190.1; 296/201

(58) Field of Classification Search ............ 296/146.16, 296/190.1, 190.11, 201, 146.2, 146.3; 49/502, 49/125, 498.1, 374, 380
See application file for complete search history.

(56) References Cited

U.S. PATENT DOCUMENTS

| | | | | |
|---|---|---|---|---|
| 4,793,099 A | * | 12/1988 | Friese et al. | 49/380 |
| 4,932,161 A | * | 6/1990 | Keys et al. | 49/490.1 |
| 5,054,242 A | * | 10/1991 | Keys et al. | 49/490.1 |
| 5,139,307 A | * | 8/1992 | Koops et al. | 296/201 |
| 5,497,578 A | | 3/1996 | Wautelet | |
| 6,220,650 B1 | * | 4/2001 | Davis et al. | 296/146.16 |
| 6,223,470 B1 | | 5/2001 | Millard | |
| 6,260,905 B1 | * | 7/2001 | Wagner | 296/146.16 |
| 6,260,916 B1 | * | 7/2001 | Hunt | 296/190.11 |
| 6,299,235 B1 | * | 10/2001 | Davis et al. | 296/146.16 |
| 6,394,529 B2 | * | 5/2002 | Davis et al. | 296/146.16 |
| 6,422,638 B1 | * | 7/2002 | Carnaghi et al. | 296/146.16 |
| 6,520,562 B2 | * | 2/2003 | Pyo | 296/183.1 |
| 6,572,176 B2 | * | 6/2003 | Davis et al. | 296/146.16 |
| 6,582,012 B1 | * | 6/2003 | Smith | 296/208 |
| 6,691,464 B2 | | 2/2004 | Nestell | |
| 6,695,394 B2 | * | 2/2004 | Takahashi | 296/190.11 |
| 6,729,674 B2 | * | 5/2004 | Davis et al. | 296/146.16 |
| 6,786,535 B1 | * | 9/2004 | Grzegorzewski et al. | 296/190.11 |
| 6,805,397 B1 | * | 10/2004 | Chernoff et al. | 296/146.2 |
| 6,869,128 B2 | * | 3/2005 | Farrar et al. | 296/146.16 |
| 6,880,293 B2 | * | 4/2005 | Ishikawa et al. | 49/414 |
| 6,910,370 B2 | * | 6/2005 | Clark et al. | 73/118.03 |
| 7,036,872 B1 | * | 5/2006 | Czirmer | 296/190.11 |
| 7,038,414 B2 | * | 5/2006 | Daniels et al. | 318/466 |

(Continued)

*Primary Examiner* — Glenn Dayoan
*Assistant Examiner* — Gregory Blankenship
(74) *Attorney, Agent, or Firm* — Porter, Wright, Morris & Arthur, LLP; Richard M. Mescher; Dean B. Watson

(57) ABSTRACT

A window assembly includes a stationary glazing panel, a moving glazing panel, and a drive mechanism to selectively move the moving glazing panel. A window frame supports the stationary glazing panel. A mounting frame is located at least partially below the moving glazing panel and is configured to capture any water entering the vehicle at the moving glazing panel and to direct the water to a drain. Outer surfaces of the glazing panels are flush to each other. In one disclosed embodiment, tops of the stationary glazing panel and the moving glazing panel are exposed. In another disclosed embodiment, the side and top of the stationary glazing panel are flush mounted. In another disclosed embodiment, the side and top of the stationary glazing panel is flush mounted and a trim member visually covers the top of the moving glazing panel when the moving glazing panel is in the closed position.

53 Claims, 10 Drawing Sheets

U.S. PATENT DOCUMENTS

| | | |
|---|---|---|
| 7,080,874 B2 * | 7/2006 | Farrar et al. .............. 296/146.16 |
| 7,083,220 B2 * | 8/2006 | Suzuki ..................... 296/146.16 |
| 7,150,493 B2 * | 12/2006 | Kinoshita et al. .......... 296/146.2 |
| 7,155,863 B2 * | 1/2007 | Daniel et al. .................... 49/413 |
| 7,213,370 B2 | 5/2007 | Dedrich |
| 7,247,096 B2 * | 7/2007 | Vancura .......................... 463/25 |
| 7,287,802 B2 * | 10/2007 | Dankert et al. .......... 296/146.16 |
| 7,673,419 B2 * | 3/2010 | Arimoto ......................... 49/380 |
| 7,789,450 B2 * | 9/2010 | Seiple et al. ............. 296/146.15 |
| 7,823,963 B2 * | 11/2010 | Gambatese et al. ...... 296/203.04 |
| 8,069,615 B2 * | 12/2011 | Heiman et al. ................ 49/498.1 |
| 2005/0044798 A1 * | 3/2005 | Daniel et al. .................... 49/413 |
| 2005/0184557 A1 * | 8/2005 | Suzuki ..................... 296/146.16 |
| 2007/0157522 A1 | 7/2007 | Hebert |
| 2010/0146859 A1 * | 6/2010 | Gipson et al. .................. 49/348 |

\* cited by examiner

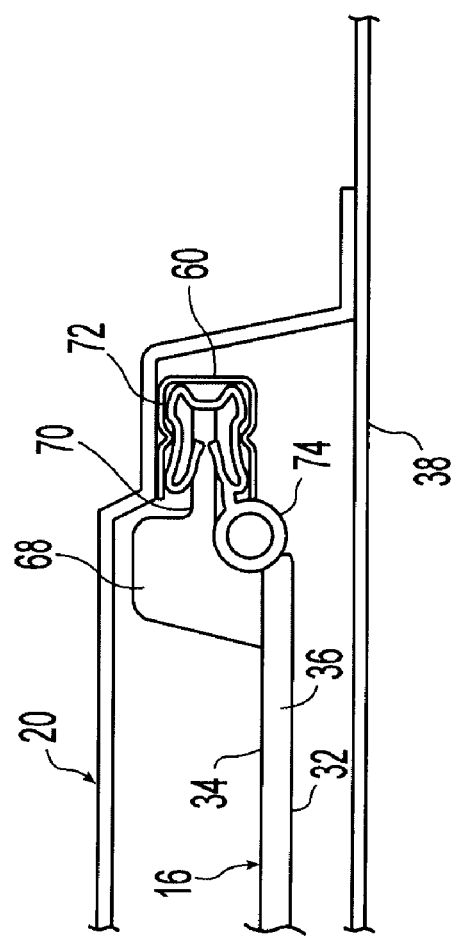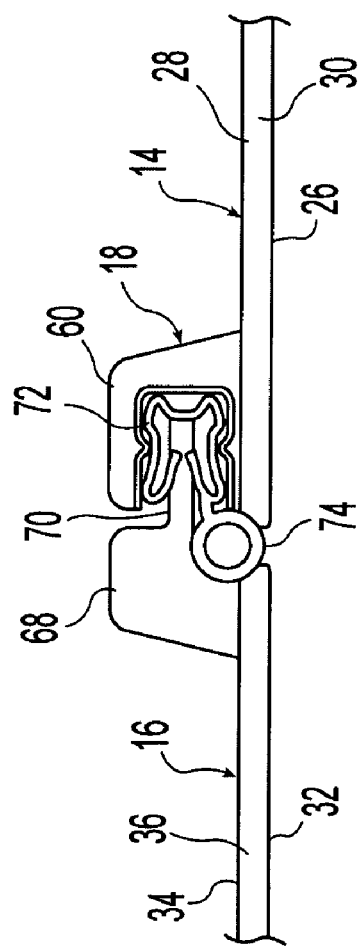

FLUSH DROP-GLASS WINDOW MODULE

CROSS-REFERENCE TO RELATED APPLICATIONS

This application claims the benefit of U.S. Provisional Patent Application No. 60/984,783 filed on Nov. 2, 2007, the disclosure of which is expressly incorporated herein in its entirety by reference.

STATEMENT REGARDING FEDERALLY SPONSORED RESEARCH

Not Applicable

REFERENCE TO MICROFICHE APPENDIX

Not Applicable

FIELD OF THE INVENTION

The field of the present invention generally relates to window assemblies for motor vehicles.

BACKGROUND OF THE INVENTION

Many motor vehicles such as, for example, pickup trucks have window assemblies with sliding panes. These sliding panes or "sliders" each move between an open position and a closed position to selectively improve airflow and/or circulation within the motor vehicles. The sliding pane can also provide access to the bed of the pickup truck from the passenger compartment. The sliding panes can be manually operated or operated by an electric motor. Typically, such window assemblies include a supporting structure that supports one or more sliding panes along with one or more fixed panes. The sliding panes can be moved either horizontally or vertically relative to the fixed panes.

Such window assemblies with a "drop-glass" or vertically sliding pane offer advantages over window assemblies with a horizontally sliding pane such as, for example, the ability to provide larger openings. However, it has been difficult to meet performance requirements with regard to water/moisture intrusion with these vertical sliding panes. Most notably, seals of the sliding panes may loose effectiveness over time.

Many motor vehicle manufacturers have also expressed interest the window assemblies having a flush appearance between the stationary panes and the moving panes, that is, where the outer surfaces of the stationary panes and the moving panes are substantially in the same plane when the movable panes are in their closed positions. This flush appearance has been accomplished with many complicated means for moving the moving pane in two different directions (both side-to-side and in-and-out). It is noted that it is a never ending desire in the motor vehicle industry to reduce cost and/or weight. Accordingly, there is a need in the art for an improved window assembly for a motor vehicle.

SUMMARY OF THE INVENTION

Disclosed herein are window assemblies having moving panes which address one or more issues of the related art. As described herein, there is disclosed a dropping glass window assembly for mounting to a vehicle comprises, in combination, at least one stationary glazing panel, at least one moving glazing panel movable between a closed position located adjacent the at least one stationary glazing panel and an open position located at least partially below the closed position to form an opening adjacent the at least one stationary glazing panel, and a drive mechanism operably connected to the at least one moving glazing panel to selectively move the at least one moving glazing panel between the closed position and the open position. The at least one stationary glazing panel has an outer surface, an inner surface, and a peripheral edge and the at least one moving glazing panel has an outer surface, an inner surface and a peripheral edge. A window frame supports the at least one stationary glazing panel for mounting the at least one stationary glazing panel to the vehicle. A mounting frame is located at least partially below the at least one moving glazing panel and configured to capture water entering past the at least one moving glazing panel and to direct said water to at least one drain.

As described herein, there is disclosed a dropping glass window assembly for mounting to a vehicle comprises, in combination, at least one stationary glazing panel, at least one moving glazing panel movable between a closed position located adjacent the at least one stationary glazing panel and an open position located at least partially below the closed position to form an opening adjacent the at least one stationary glazing panel, and a drive mechanism operably connected to the at least one moving glazing panel to selectively move the at least one moving glazing panel between the closed position and the open position. The at least one stationary glazing panel has an outer surface, an inner surface, and a peripheral edge and the at least one moving glazing panel has an outer surface, an inner surface and a peripheral edge. A window frame supports the at least one stationary glazing panel for mounting the at least one stationary glazing panel to the vehicle. The outer surfaces of the stationary glazing panel and the moving glazing panel are flush to each other and at least top portions of the peripheral edges of the stationary glazing panel and the moving glazing panel are exposed.

As described herein, there is disclosed a dropping glass window assembly for mounting to a vehicle comprises, in combination, at least one stationary glazing panel, at least one moving glazing panel movable between a closed position located adjacent the at least one stationary glazing panel and an open position located at least partially below the closed position to form an opening adjacent the at least one stationary glazing panel, and a drive mechanism operably connected to the at least one moving glazing panel to selectively move the at least one moving glazing panel between the closed position and the open position. The at least one stationary glazing panel has an outer surface, an inner surface, and a peripheral edge and the at least one moving glazing panel has an outer surface, an inner surface and a peripheral edge. A window frame supports the at least one stationary glazing panel for mounting the at least one stationary glazing panel to the vehicle. The outer surfaces of the stationary glazing panel and the moving glazing panel are flush to each other and the window frame does not extend beyond the outside surface of the stationary glazing panel at a top portion and a side portion of the peripheral edge of the stationary glazing panel.

As described herein, there is disclosed a dropping glass window assembly for mounting to a vehicle comprises, in combination, at least one stationary glazing panel, at least one moving glazing panel movable between a closed position located adjacent the at least one stationary glazing panel and an open position located at least partially below the closed position to form an opening adjacent the at least one stationary glazing panel, and a drive mechanism operably connected to the at least one moving glazing panel to selectively move the at least one moving glazing panel between the closed position and the open position. The at least one stationary glazing panel has an outer surface, an inner surface, and a peripheral edge and the at least one moving glazing panel has an outer surface, an inner surface and a peripheral edge. A window frame supports the at least one stationary glazing panel for mounting the at least one stationary glazing panel to the vehicle. The outer surfaces of the stationary glazing panel and the moving glazing panel are flush to each other and the window frame does not extend beyond the outside surface of the stationary glazing panel at a side portion of the peripheral edge of the stationary glazing panel. A trim member is positioned to visually cover at least a top portion of the peripheral edge of the moving glazing panel when the moving glazing panel is in the closed position.

From the foregoing disclosure and the following more detailed description of various preferred embodiments it will be apparent to those skilled in the art that the present invention provides a significant advance in the technology and art of window assemblies for motor vehicles. Particularly significant in this regard is the potential the invention affords for providing a high quality, feature-rich window assembly which meets performance and appearance requirements. Additional features and advantages of various preferred embodiments will be better understood in view of the detailed description provided below.

BRIEF DESCRIPTION OF THE DRAWINGS

These and further features of the present invention will be apparent with reference to the following description and drawing, wherein:

FIG. 4 is an enlarged cross-sectional view taken along line 4-4 of FIG. 2;

FIG. 5 is an enlarged cross-sectional view taken from line 5-5 of FIG. 2;

Figure 1:
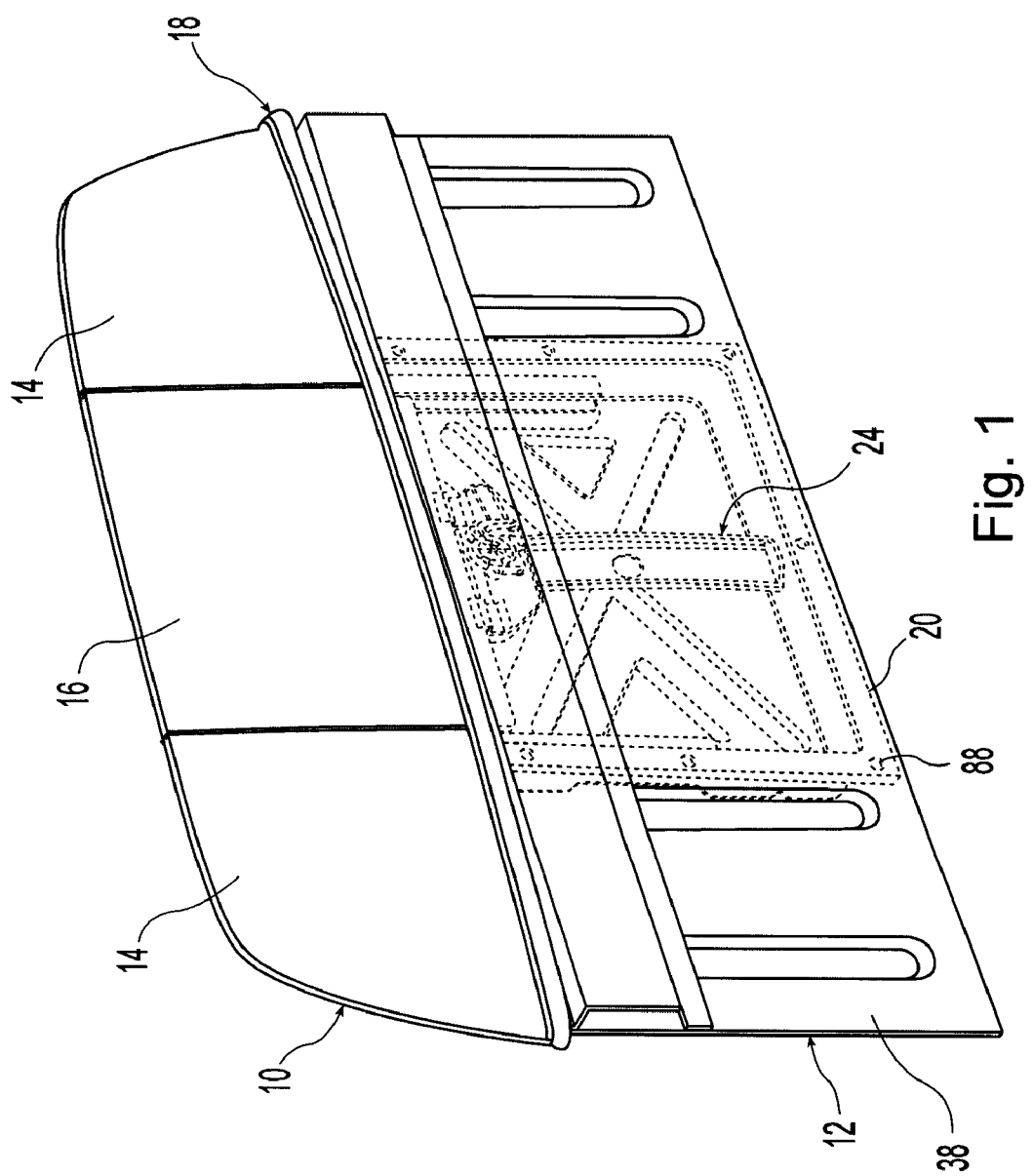
FIG. 1 is a perspective view of a portion of motor vehicle having a window assembly according to the present invention, wherein portions of the motor vehicle are removed for clarity.

It should be understood that the appended drawings are not necessarily to scale, presenting a somewhat simplified representation of various preferred features illustrative of the basic principles of the invention. The specific design features of the window assemblies as disclosed herein, including, for example, specific dimensions and shapes of the various components will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the slider window assembly illustrated in the drawings. In general, up or upward refers to an upward direction within the plane of the paper in FIG. 2 and down or downward refers to a downward direction within the plane of the paper in FIG. 2. Also in general, fore or forward refers to a direction toward the front of the motor vehicle and into of the plane of the paper in FIG. 2 and aft, rear, or rearward refers to a direction toward the rear of the motor vehicle and out of the plane of the paper in FIG. 2. Also right refers to a direction toward the right side of the motor vehicle and to the right within the plane of the paper in FIG. 2 and left refers to a direction toward the left side of the motor vehicle and to the left within the plane of the paper in FIG. 2.

DETAILED DESCRIPTION OF CERTAIN PREFERRED EMBODIMENTS

The following detailed discussion of various alternative and preferred embodiments will illustrate the general principles of the invention with reference to a fully-flush window assembly for use as a backlight of a pickup or other light duty truck. Other embodiments suitable for other applications will be apparent to those skilled in the art given the benefit of this disclosure.

Referring now to the drawings, FIGS. 1 to 13 show a window assembly 10 of a motor vehicle 12 according to the present invention. The illustrated window assembly 10 includes at least one fixed or stationary glazing panel 14, at least one moving glazing panel 16 movable between a closed position located adjacent the stationary glazing panel 14 and an open position located at least partially below the closed position to form an opening adjacent the stationary glazing panel 14, a window frame 18 supporting the stationary glazing panel 14 for mounting the stationary glazing panel 14 to the vehicle 12, a mounting frame 20 located at least partially below the moving glazing panel 16 and configured to capture water entering past the sealing system of the moving glazing panel 16 and to direct the water to at least one drain 22, and a drive mechanism 24 operably connected to the moving glazing panel 16 to selectively move the moving glazing panel 16 between the closed position and the open position.

The illustrated window assembly 10 includes two of the stationary glazing panels 14 that are laterally spaced-apart to be on opposite sides of the moving glazing panel 16. Each of the illustrated stationary glazing panels 14 has an outer surface 26, an inner surface 28 opposite the outer surface 26, and a peripheral edge 30 that defines the geometric shape of the panel 14. The illustrated stationary glazing panels 14 are generally rectangular shaped but it is noted that any other suitable shape can alternatively be utilized. The stationary glazing panels 14 may be curved, bent, or generally planar to conform to the desired need or application.

The stationary glazing panels 14 are preferably formed of transparent glass which may be tempered, laminated, or otherwise strengthened using conventional techniques and principles. Although glass is preferred, other suitable relatively rigid, sheet-like panel materials may alternatively be used such as, for example, plastic materials, multi-component laminates (for example, laminates of glass and plastic), or the like. Although a transparent material is preferred, other suitable materials may alternatively be used such as, for example, opaque, translucent, transparent coated materials, or the like. When desired, an opaque ceramic frit layer or coating may cover all or a portion of the stationary glazing panels 16. Usually, the frit layer is utilized to form a continuous strip on the inner surface 28 near the peripheral edge 30 of the stationary glazing panels 14. When viewed from the exterior of the motor vehicle 12, the frit layer provides an appearance of depth and richness which blends with surrounding painted or glass surfaces of the motor vehicle 12 and/or hides and conceals components mounted to the stationary glazing panels 14 within the motor vehicle 12.

The illustrated window assembly 10 includes one moving glazing panel 16 that sized to entirely cover the opening formed between the stationary glazing panels 14 when the moving glazing panel 16 is in its closed position. The illustrated moving glazing panel 16 has an outer surface 32, an inner surface 34 opposite the outer surface 32, and a peripheral edge 36 that defines the geometric shape of the panel 16. The illustrated moving glazing panel 16 is generally rectangular shaped but it is noted that any other suitable shape can alternatively be utilized. The moving glazing panel 16 may be curved, bent, or generally planar to conform to the desired need or application.

The moving glazing panel 16 is preferably formed of transparent glass which may be tempered, laminated, or otherwise strengthened using conventional techniques and principles. Although glass is preferred, other suitable relatively rigid, sheet-like panel materials may alternatively be used such as, for example, plastic materials, multi-component laminates (for example, laminates of glass and plastic), or the like. Although a transparent material is preferred, other suitable materials may alternatively be used such as, for example, opaque, translucent, transparent coated materials, or the like. When desired, an opaque ceramic frit layer or coating may cover all or a portion of the moving glazing panel 16. Usually, the frit layer is utilized to form a continuous strip on the inner surface 34 near the peripheral edge 36. When viewed from the exterior of the motor vehicle 12, the frit layer provides an appearance of depth and richness which blends with surrounding painted or glass surfaces of the motor vehicle 12 and/or hides and conceals components mounted to the moving glazing panel 16 within the motor vehicle 12.

The motor vehicle 12 preferably includes one or more body panels or sheet metal panels 38 that define a recessed window flange 40 forming an opening. The illustrated stationary and moving glazing panels 14, 16 are mounted such that the outer surfaces 26, 32 are flush with one another and are sized to fully close the motor vehicle opening. The window frame 18 supports and connects the stationary glazing panels 14 and mounts the stationary panels 14 to the window flange 40 of the motor vehicle 12. The illustrated window frame 18 is provided with a plurality of encapsulated threaded studs 42 that extend through openings in the window flange 40 and are secured by nuts 44 or the like (best shown in FIGS. 10 to 12). The illustrated window frame 18 is mounted with seven of the studs 42 but it is noted that any other suitable quantity of the studs 42 can alternatively be utilized. A bead or gasket 46 of suitable sealing material is provided on the window frame 18 to form a water-tight seal between the window frame 18 and the window flange 40 (best shown in FIGS. 12 and 13). It is noted that any other suitable mechanical fasteners can alternatively be utilized. It is also noted that the window frame 18 can alternatively be secured to the window flange 40 by bonding with an adhesive material such as, for example, a urethane adhesive or the like. It is noted that the adhesive which affixes the window frame 18 to the body panels 38 and also forms a water-tight seal between the window frame 18 and the window flange 40. The illustrated window flange 40 is recessed such that the outer surfaces 26 of the stationary panels 14 are substantially flush with an exterior surface of the adjacent body panels 38.

The illustrated window frame 18 has a generally horizontal top portion that extends between outer sides of the stationary glazing panels 14 at the top of the stationary glazing panels 14, a generally horizontal bottom portion that extends between the outer sides of the stationary glazing panels 14 at the bottom of the stationary glazing panels 14, generally vertical left and right outer side portions that connect the outer ends of the top and bottom portions at outer sides of the stationary glazing panels 14, and generally vertical left and right inner side portions that connect the top and bottom portions at inner sides of the stationary glazing panels 14.

Figure 10:
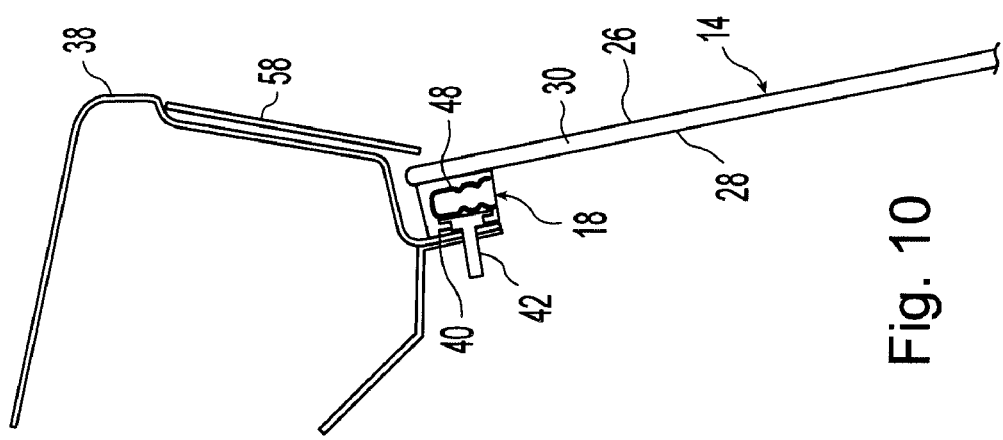
FIG. 10 is an enlarged cross-sectional view taken from line 10-10 of FIG. 2.
Figure 9:
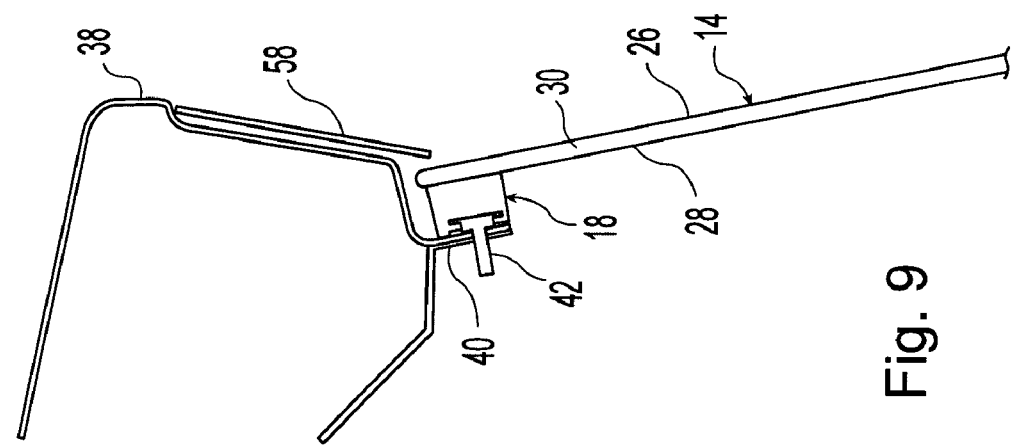
FIG. 9 is an enlarged cross-sectional view taken from line 9-9 of FIG. 2.

As best shown in FIGS. 9 and 10, the illustrated top portion of the window frame 18 engages only the inner surface 28 of the stationary glazing panels 14 so that the top portions of the peripheral edges 30 of the stationary glazing panels 14 are flush mounted, that is, the window frame 18 does not extend outward beyond the outer surface 26 of the stationary glazing panels 14. It is noted that the illustrated the top portions of the peripheral edges 30 of the stationary glazing panels 14 are exposed, that is, they are not covered by the window frame 18 or any other component. As best shown in FIGS. 10 and 11, the illustrated top portion of the window frame 18 is provided with a downward facing encapsulated channel 48 which extends at least between the inner sides of the stationary glazing panels 14. The channel 48 is sized and shaped to secure a seal member 50 which engages the moving glazing panel 16 when the moving glazing panel 16 is in its closed position to seal the top of the moving glazing panel 16. The illustrated seal member 50 includes a first bulb portion 52 engaging the inner surface 34 of the moving glazing panel 16 and a second bulb portion 54 engaging the top portion of the peripheral edge 36 of the moving glazing panel 16. A stop member or flange 56 extends from the channel 48 and is located above the moving glazing panel 16 with the second bulb portion 54 at its lower surface. The stop member 56 supports the second bulb portion 54 and provides a positive full-up stop for the moving glazing panel 16. The illustrated stop member 56 is formed of sheet metal but any other suitable material can alternatively be utilized. It is noted that the seal member 50 can alternatively have any other suitable form.

The illustrated vehicle 12 is provided with a trim member 58 positioned to visually cover at least a top portion of the peripheral edge 36 of the moving glazing panel 16 when the moving glazing panel 16 is in the closed position. Thus, the trim panel 58 covers the seal member 50 so that only flush mounted edges are visible (other than the bottom edge which is not flush mounted). The trim member 58 can extend across only the top of the moving glazing panel 16 or can extend across the tops of both the moving glazing panel 16 and the stationary glazing panels 14 or anything in between.

Figures 11A, 11B, 11C:
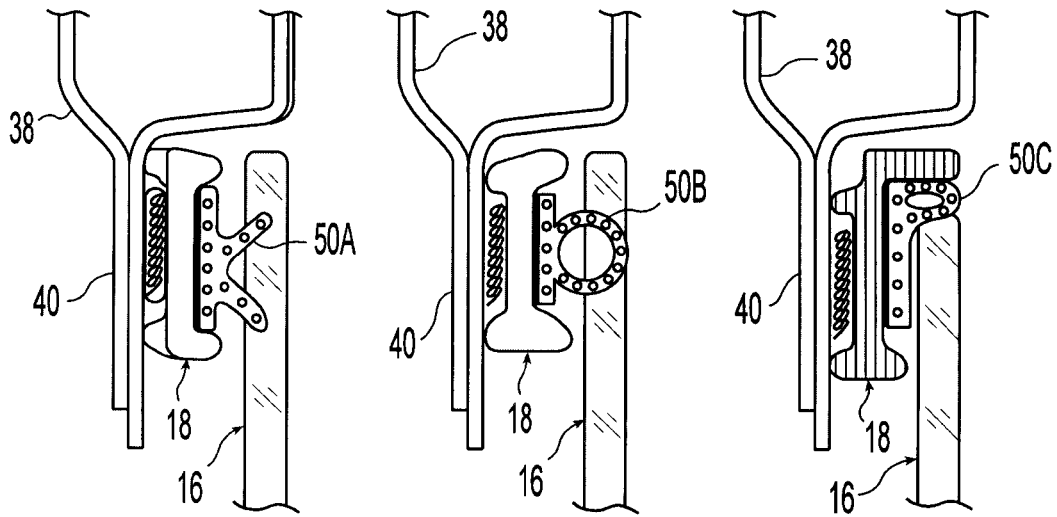
FIG. 11A is a cross-sectional view similar to FIG. 11 but showing an alternative interface between the moving panel and the window frame.
FIG. 11B is a cross-sectional view similar to FIGS. 11 and 11A but showing a second alternative interface between the moving panel and the window frame.
FIG. 11C is a cross-sectional view similar to FIGS. 11 to 11B but showing a third alternative interface between the moving panel and a frame.
Figure 8:
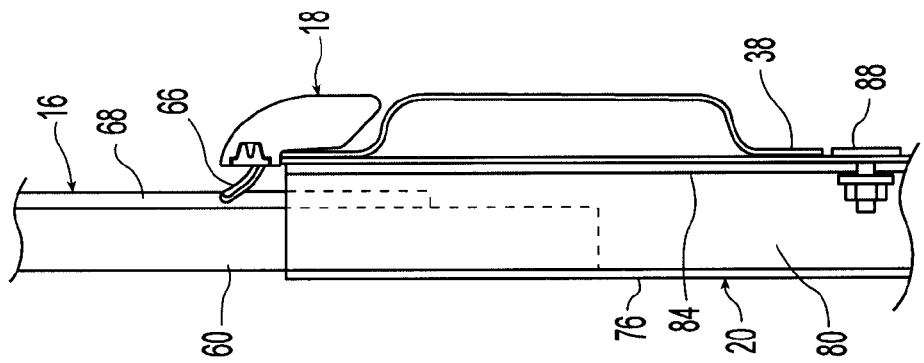
FIG. 8 is an enlarged cross-sectional view taken from line 8-8 of FIG. 2.
Figure 11:
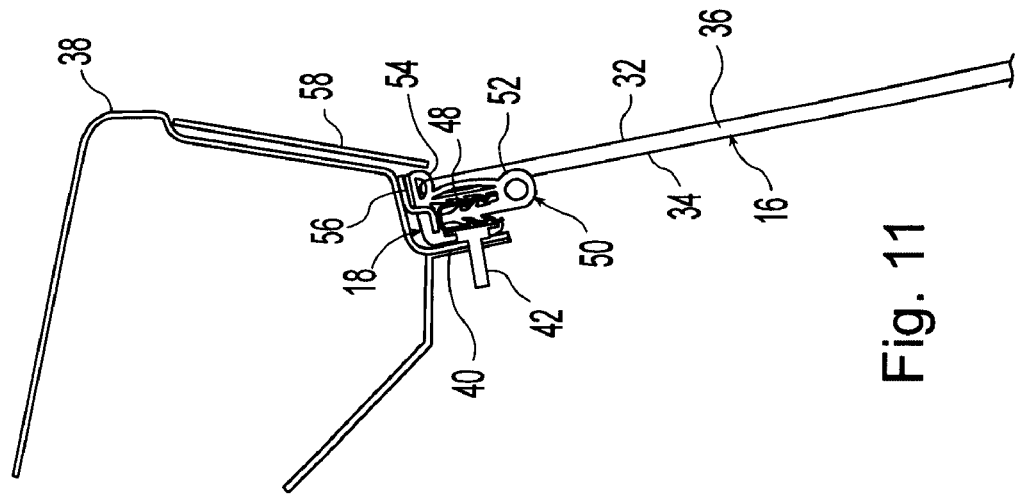
FIG. 11 is an enlarged cross-sectional view taken from line 11-11 of FIG. 2.

FIGS. 11A to 11C illustrate alternative embodiments for the seal member 50 for sealing the top of the moving glazing panel 16. FIG. 11A shows a wiper type seal member 50A that engages only the inner surface 34 of the moving glazing panel 16. The window frame 18 thus engages only the inner surface 34 of the moving glazing panel 16 so that top portion of the peripheral edge 36 of the moving glazing panel 16 is flush mounted, that is, the window frame 18 does not extend outward beyond the outer surface 32 of the moving glazing panel 16. It is noted that the illustrated top portion of the peripheral edge 36 of the moving glazing panel 16 is exposed, that is, it is not covered by the window frame 18 or any other component. FIG. 11B shows a bulb type seal member 50B that engages only the inner surface 34 of the moving glazing panel 16. The window frame 8 thus engages only the inner surface 34 of the moving glazing panel 16 so that top portion of the peripheral edge 36 of the moving glazing panel 16 is flush mounted, that is, the window frame 18 does not extend outward beyond the outer surface 32 of the moving glazing panel 16. It is noted that the illustrated top portion of the peripheral edge 36 of the moving glazing panel 16 is exposed, that is, it is not covered by the window frame 18 or any other component. Thus, the top portions of the peripheral edges 30, 36 of both the stationary glazing panels 14 and the moving glazing panel 16 are exposed. FIG. 11C shows a bulb type seal member 50C that engages only the top portion of the peripheral edge 36 of the moving glazing panel 16. The top portion of the peripheral edge 36 of the moving glazing panel 16 is flush mounted, that is, the window frame 18 does not extend outward beyond the outer surface 32 of the moving glazing panel 16.

Figure 12:
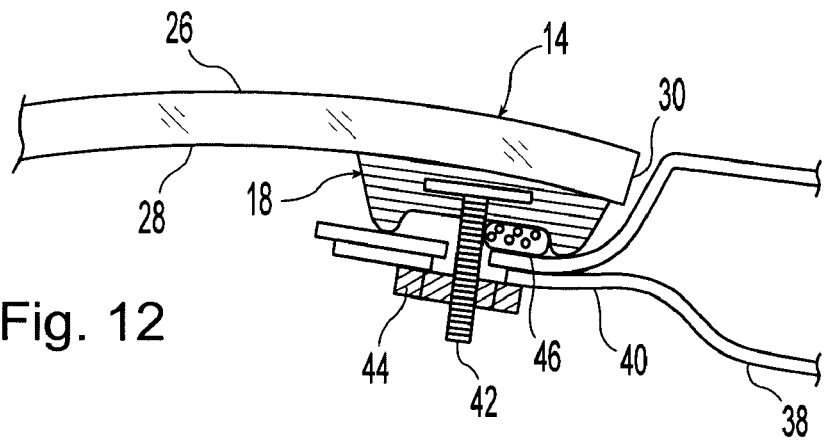
FIG. 12 is an enlarged cross-sectional view taken from line 12-12 of FIG. 2.
Figure 13:
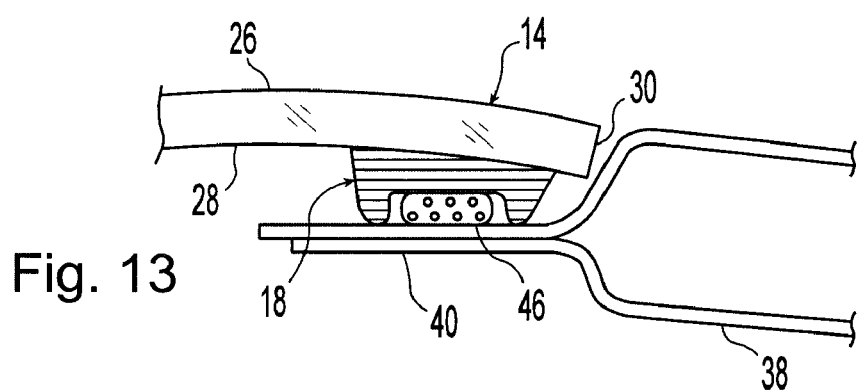
FIG. 13 is an enlarged cross-sectional view taken from line 13-13 of FIG. 3.

As best shown in FIGS. 12 and 13, the illustrated outer side portions of the window frame 18 engage only the inner surface 28 of the stationary glazing panels 14 so that the outer side portions of the peripheral edges 30 of the stationary glazing panels 14 are flush mounted, that is, the window frame 18 does not extend outward beyond the outer surface 26 of the stationary glazing panels 14. It is noted that the illustrated outer side portions of the peripheral edges 30 of the stationary glazing panels 14 are exposed, that is, they are not covered by the window frame 18 or any other component. Thus, both the top and side edges of the illustrated stationary glazing panels 14 are flush mounted, that is, the window frame 18 does not extend beyond the outer surface 26 of the stationary glazing panels 14 at the top portions and the side portions of the peripheral edges 30 of the stationary glazing panels 14.

Figure 13A:
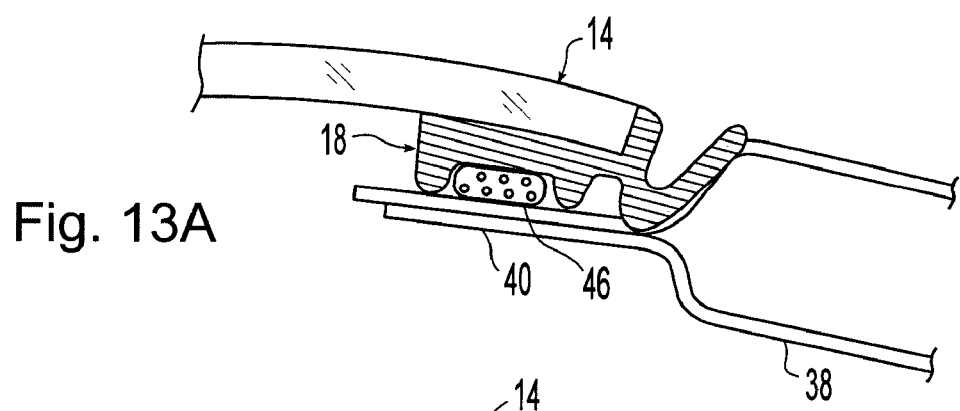
FIG. 13A is a cross-sectional view similar to FIG. 13 but showing an alternative interface between the frame and the motor vehicle body.
Figure 13B:
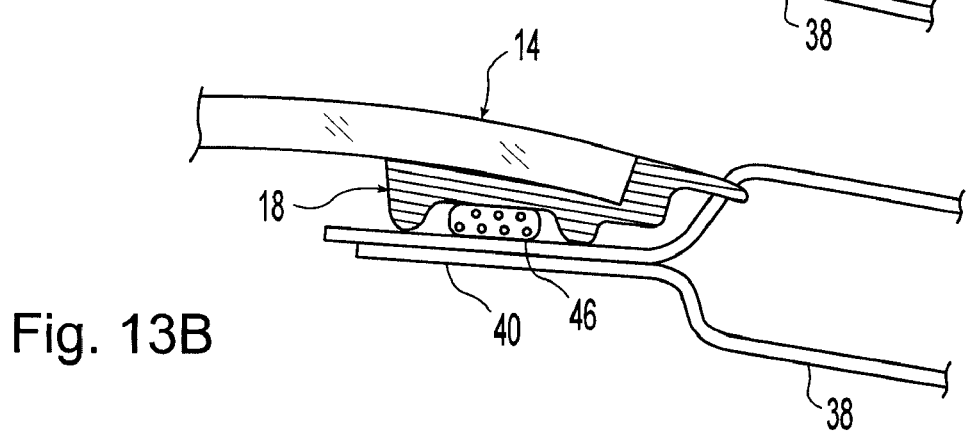
FIG. 13B is a cross-sectional view similar to FIGS. 13 and 13A but showing a second alternative interface between the frame and the motor vehicle body.

FIGS. 13A and 13B illustrate alternative embodiments for the outer side portions of the window frame 18 wherein the outer side portions also engage the outer side portions of the peripheral edges 30 of the stationary glazing panels 14. The alternative embodiments show that outer sides of the stationary glazing panels 14 can be flush mounted without having an exposed peripheral edge 30.

As best shown in FIG. 4, the illustrated inner side portions of the window frame 18 engage only the inner surfaces 28 of the stationary glazing panels 14 so that the inner side portions of the peripheral edges 30 of the stationary glazing panels 14 are flush mounted, that is, the window frame 18 does not extend outward beyond the outer surfaces 26 of the stationary glazing panels 14. It is noted that the illustrated the inner side portions of the peripheral edges 30 of the stationary glazing panels 14 are exposed, that is, they are not covered by the window frame 18 or any other component. The illustrated inner side portions support vertically extending encapsulated rails 60 for guiding the moving glazing panel 16 between its closed and open positions as described in more detail herein below. The illustrated rails 16 are channel shaped in cross section and face laterally inward toward the moving glazing panel 16.

Figure 7:
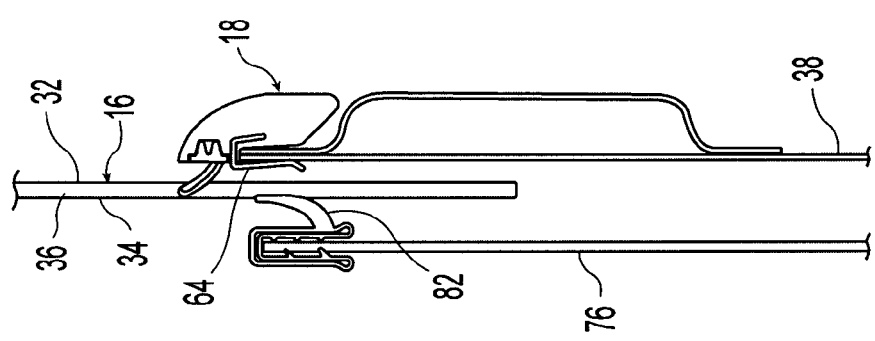
FIG. 7 is an enlarged cross-sectional view taken from line 7-7 of FIG. 2.
Figure 6:
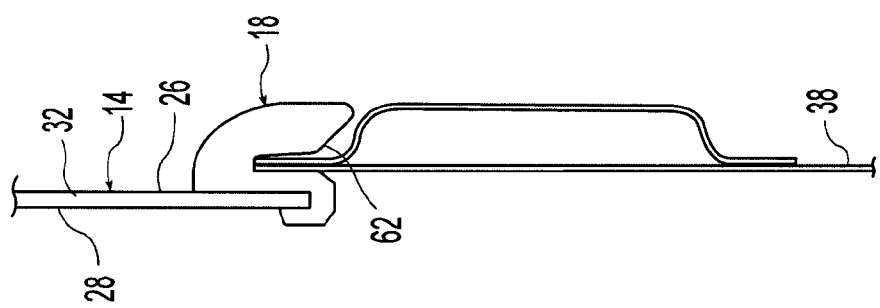
FIG. 6 is an enlarged cross-sectional view taken from line 6-6 of FIG. 2.

As best shown in FIG. 6, between the inner and outer side portions of the window frame 18, the illustrated bottom portion of the window frame 18 extends around the bottom edges of the stationary glazing panels 16, that is, it engages the inner surface 28, the bottom portion of the peripheral edge 30 and the outer surface 26 of the panels 14. The illustrated bottom portion of the window frame 18 is also provided with a downward facing slot 62 receiving the upper edge of the body panel 38 therein. The rearward side of the window frame bottom portion extends the entire length of the window assembly 10 (best shown in FIG. 3) and the vehicle opening (best shown in FIGS. 1 and 2). The window frame lower portion creates a water-tight seal with the window flange 40 and locates the window assembly 10 within the vehicle opening. If desired, a sealing member and/or sealing material can be provided therebetween. As best shown in FIG. 7, the illustrated bottom portion of the window frame 18 is only on the rearward side of the body panel 38 between the inner side portions of the window frame 18. If desired, the window frame bottom portion can have other suitable forms that seal the bottom edge of the opening and permit movement of the moving glazing panel 16 between its open and closed positions. The illustrated bottom portion of the window frame 18 is provided with an encapsulated clip 64 for engaging the edge of the body panel 38. The illustrated bottom portion of the window frame 18 is also provided with a seal member 66 engaging the outer surface 32 of the moving glazing panel 16 to seal the bottom of the moving glazing panel 16 when the glazing panel 16 is in the closed position. The illustrated seal member 66 is of the wiper type but any other suitable type of seal member can alternatively be utilized.

The window frame 18 preferably comprises a generally rigid plastic material but any other suitable material can be utilized. The window frame 18 can be injection molded as a unitary, one-piece component and secured to the stationary glazing panels 14 by bonding or other suitable attachment means. The window frame 18 can also be directly molded onto the stationary glazing panels 14 to form an integral subassembly.

As best shown in FIGS. 4 and 5, the illustrated moving glazing panel 16 is provided with vertically extending guide members 68 along its lateral sides that are sized and shaped to cooperate with the rails 60. The illustrated guide members 68 engage only the inner surface 34 of the moving glazing panel 16 so that the side portions of the peripheral edge 36 of the moving glazing panel 16 are flush mounted, that is, the guide members 68 do not extend outward beyond the outer surface 32 of the moving glazing panel 16. It is noted that the illustrated side portions of the peripheral edge 36 of the moving glazing panel 16 are exposed, that is, they are not covered by the guide members 68 or any other component. Each illustrated guide member 68 has a laterally extending flange 70 to cooperate with the rails 60. Each of the illustrated rails 60 are U-shaped channels in cross-section having a main wall and a pair of parallel, spaced-apart side walls perpendicularly extending from the edges of the main wall. The open sides of the rails 60 face inwardly toward each other so the guide member flanges 70 can be received in the rails 60 for vertical sliding motion of the moving glazing panel 16 between its closed and open positions. The illustrated rails 60 have runs or inserts 72 therein. The inserts 72 are preferably formed of an extruded polymeric material having a relatively low surface friction to facilitate sliding such as, for example, polypropylene.

Figure 4A:
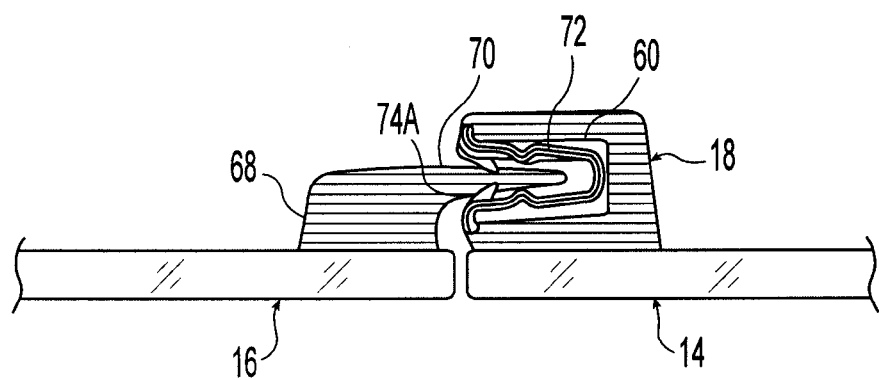
FIG. 4A is a cross-sectional view similar to FIG. 4 but showing an alternative interface between a moving panel and a stationary panel.

As best shown in FIGS. 4 and 5, the rails 60 are also provided with seal members 74 which engage the inner surfaces 28, 34 of the moving glazing panel 16 and the adjacent stationary glazing panel 14 to seal the gap between the panels 14, 16 and maintain a flush interface between the panels 14, 16. The illustrated guide members 68 each have a seal guide or surface 71 which cooperates to support and guide the seal member 74 as the guide member 68 slides along the seal member 74 as the moving glazing panel 16 is raised and lowered. The illustrated seal members 74 are mounted to the stationary glazing panels 14 and the illustrated seal guides 71 are mounted to the opposite sides of the moving glazing panel 16 but it is noted that alternatively this can be reversed so that the seal members 74 are mounted to the opposite sides of the moving glazing panel 16 and the seal guides 71 are mounted to the stationary glazing panels 14. The illustrated seal members 74 are bulb type seal members which extend partially into the gap between the panels 14, 16. It is noted that the seal members 74 can alternatively have any other suitable form, for example, the seal members 74 could alternatively have a lower profile. FIG. 4A illustrates an alternative embodiment wherein the seal member 74A is of the wiper type and located within the rail 60 so that adjacent portions of the peripheral edges 30, 36 of the stationary glazing panel 14 and the moving glazing panel 16 are only separated by an air gap.

The illustrated mounting frame 20 supports the drive mechanism 24 which in turn supports the moving glazing panel 16. The mounting frame 20 is secured to the window frame 18 in any suitable manner. The mounting frame 20 is located at least partially below the moving glazing panel 16 and configured to capture water entering past the moving glazing panel 16 and to direct the water to the drain 22 in the mounting frame 20. The illustrated mounting frame 20 has an inner wall 76, a bottom wall 78 rearwardly extending from a bottom edge of the inner wall 76, and side walls 80 rearwardly extending from side edges of the inner wall 76 to form an interior space. The top of the illustrated inner wall 76 is provided with a seal member 82 that engages the inner surface 34 of the moving glazing panel 16. The illustrated seal member 82 is a wiper type seal but it is noted that any other suitable type of seal member 82 can alternatively be utilized. The side and bottom walls 20, 18 are provided with flanges 84 for securing the mounting frame 20 to the vehicle body panel 38. The illustrated flange 84 is provided with a plurality of openings 86 which cooperate with openings in the vehicle body panel 38 to receive mechanical fasteners 88 (best shown in FIG. 8). The illustrated mounting frame 20 is mounted with eight of the mechanical fasteners 88 but it is noted that any other suitable quantity of the mechanical fasteners 88 can alternatively be utilized. A gasket or bead of suitable sealing material is preferably provided between the mounting frame 20 and the vehicle body panel 38 to form a water-tight seal therebetween. It is noted that any other suitable mechanical fasteners or other mounting means can alternatively be utilized. It is also noted that the mounting frame 20 can alternatively be bonded to the vehicle body panel 38 with adhesive material.

Mounted to the body panel 38, the mounting frame 20 cooperates with the vehicle body panel 38 to form a sealed interior space. The illustrated interior space is sized and shaped to enclose the drive mechanism 24 and the moving glazing panel 16 when in its open position. In this manner, any water that passes through the seal members 66, 82 of the moving glazing panel 16 falls into the interior space where it is directed by gravity to the drain 22 in the bottom of the mounting frame 20. The illustrated mounting frame 20 has a centrally located drain 22 and the bottom wall 78 slopes toward the drain 22 to direct water thereto (best shown in FIG. 2). The illustrated drain 22 is aligned with a vehicle drain 90 to suitably dispose of the water. It is noted that the drain 22 can alternatively have any other form and/or can alternatively be connected to the vehicle drain 90 in any other suitable manner.

Figure 14:
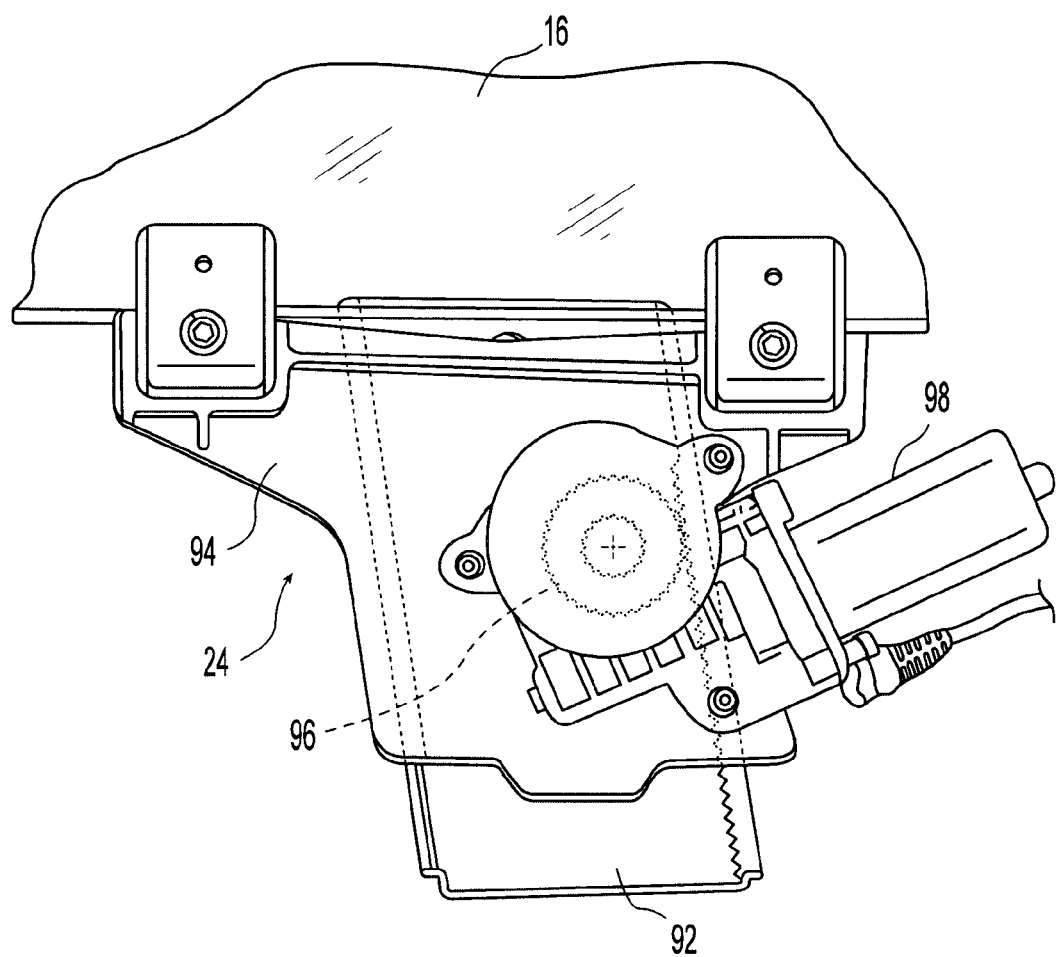
FIG. 14 is an enlarged perspective view showing a portion of FIG. 3 in the area of a drive mechanism.
Figure 14A:
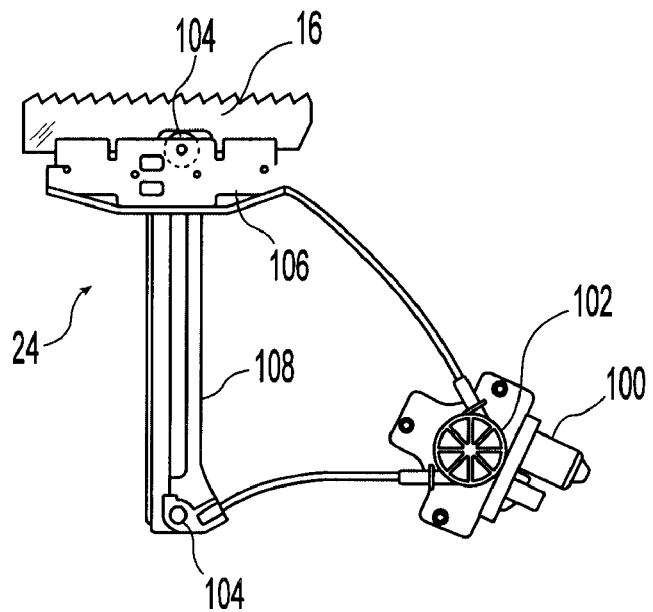
FIG. 14A is a perspective view similar to FIG. 14 but showing an alternative drive mechanism.
Figure 14B:
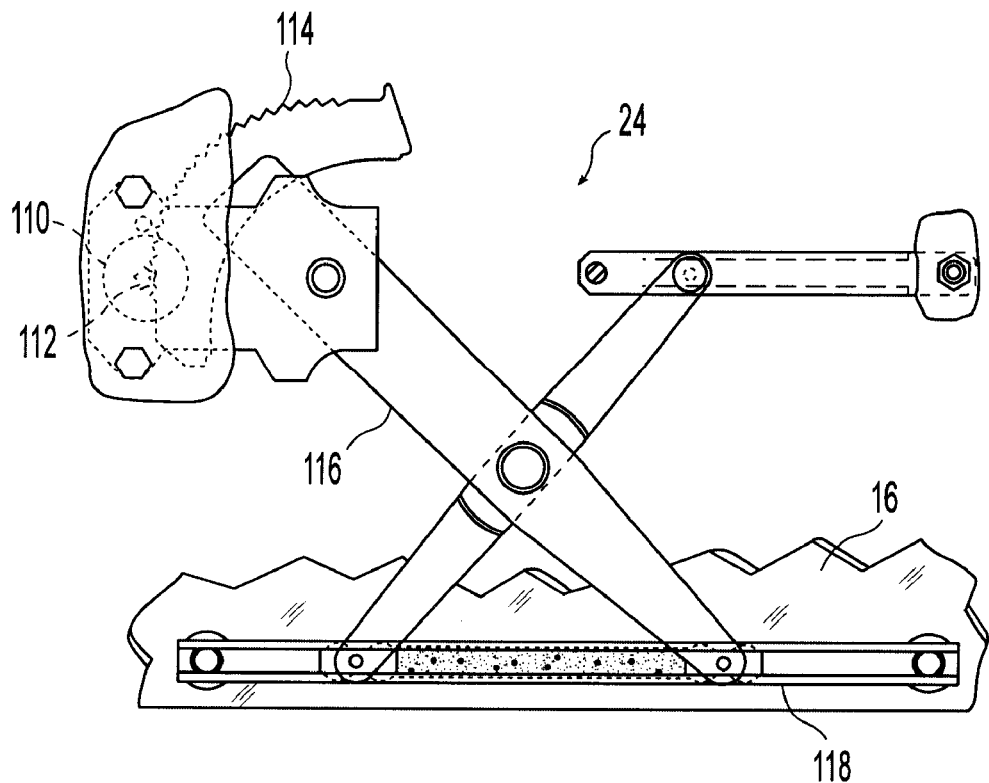
FIG. 14B is a perspective view similar to FIGS. 14 and 14A but showing a second alternative drive mechanism.

As best shown in FIG. 14, the illustrated drive mechanism 24 is a rack and pinion system which includes a vertically extending rack 92, a carrier or mounting bracket 94 attached to the moving glazing panel 16 and movable along the rack 92, a pinion 96 rotatably secured to the carrier 94 and engaging the rack 92, and an electric motor 98 operably connected to the pinion 96 for selectively rotating the pinion 96 to raise and lower the carrier 94 along the rack 92. The illustrated carrier 94 clamps the moving glazing panel 16 at a lower edge of the panel 16 with mounting brackets located at two points spaced apart points about the center of the lower edge. It is noted that the drive mechanism 24 can be secured to the moving glazing panel in any other suitable manner. For example, the mounting bracket or brackets could alternatively be secured to the outer side edges of the moving glazing panel 16. The electric motor 98 is preferably configured and controlled to provide anti-pinch protection. A suitable rack and pinion system is described in detail in U.S. Pat. No. 7,213,370, the disclosure of which is expressly described herein in its entirety by reference. It is noted that the drive mechanism 24 can alternatively be of any other suitable type. FIG. 14A shows an alternative drive system 24 in the form of a drum and cable system which includes an electric motor 100, a cable/drum assembly 102 driven by the electric motor 100, pulleys 104 for routing the cable to a carrier 106 which slides up and down a rail 108 and is attached to the moving glazing panel 16. A suitable drum and cable system is described in detail in U.S. Pat. No. 6,223,470, the disclosure of which is expressly described herein in its entirety by reference. FIG. 14B shows another alternative drive system in the form of an arm and sector system which includes an electric motor 110, a pinion 112 driven by the electric motor 110, a sector 114 engaging the pinion 112 and having a lift arm 116 slidably secured to a rail 118 attached to the moving glazing panel 16. A suitable arm and sector system is described in detail in U.S. Pat. No. 5,497,578, the disclosure of which is expressly described herein in its entirety by reference.

Figure 2:
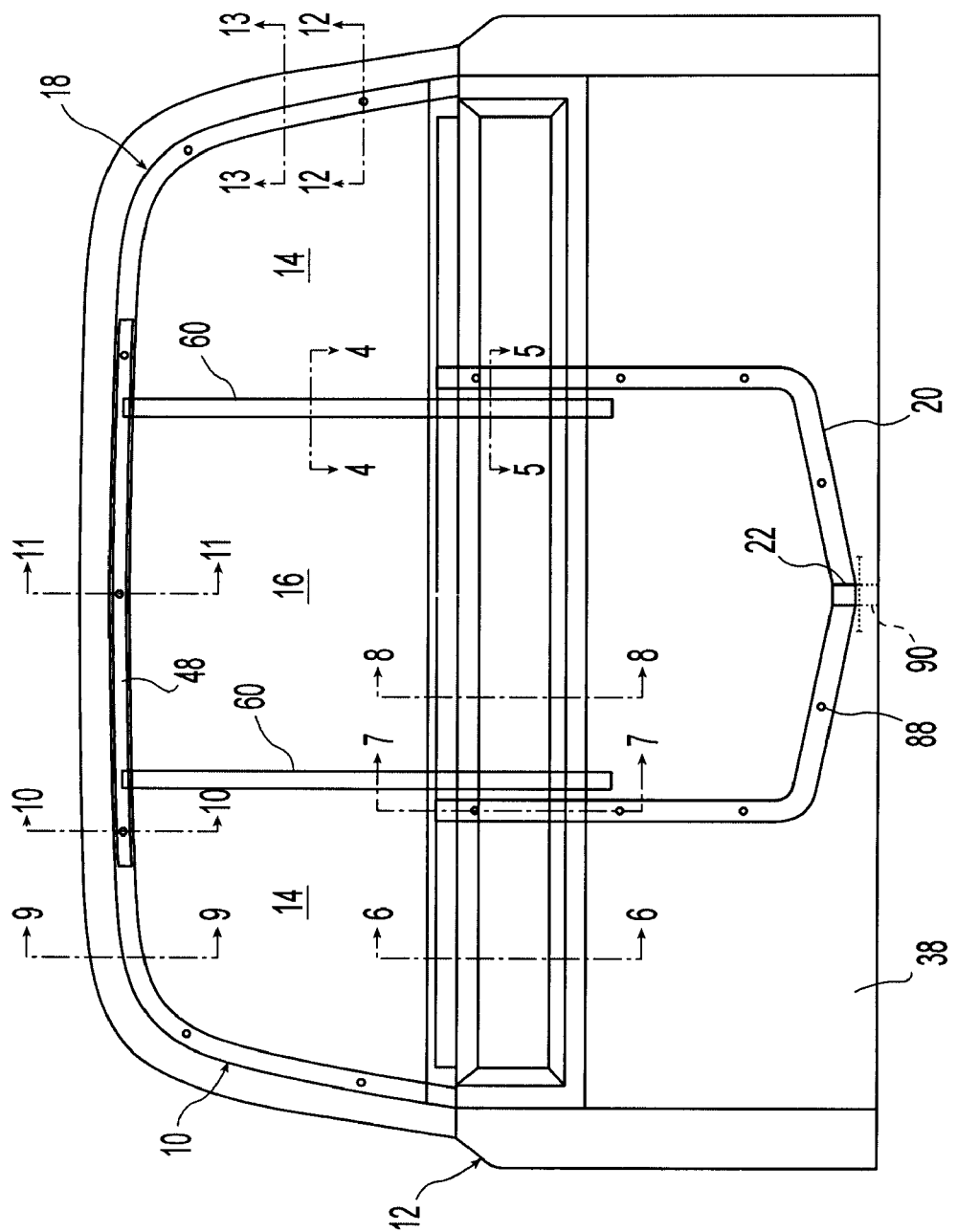
FIG. 2 is a rear schematic view of the motor vehicle and window assembly of FIG. 1.
Figure 3:
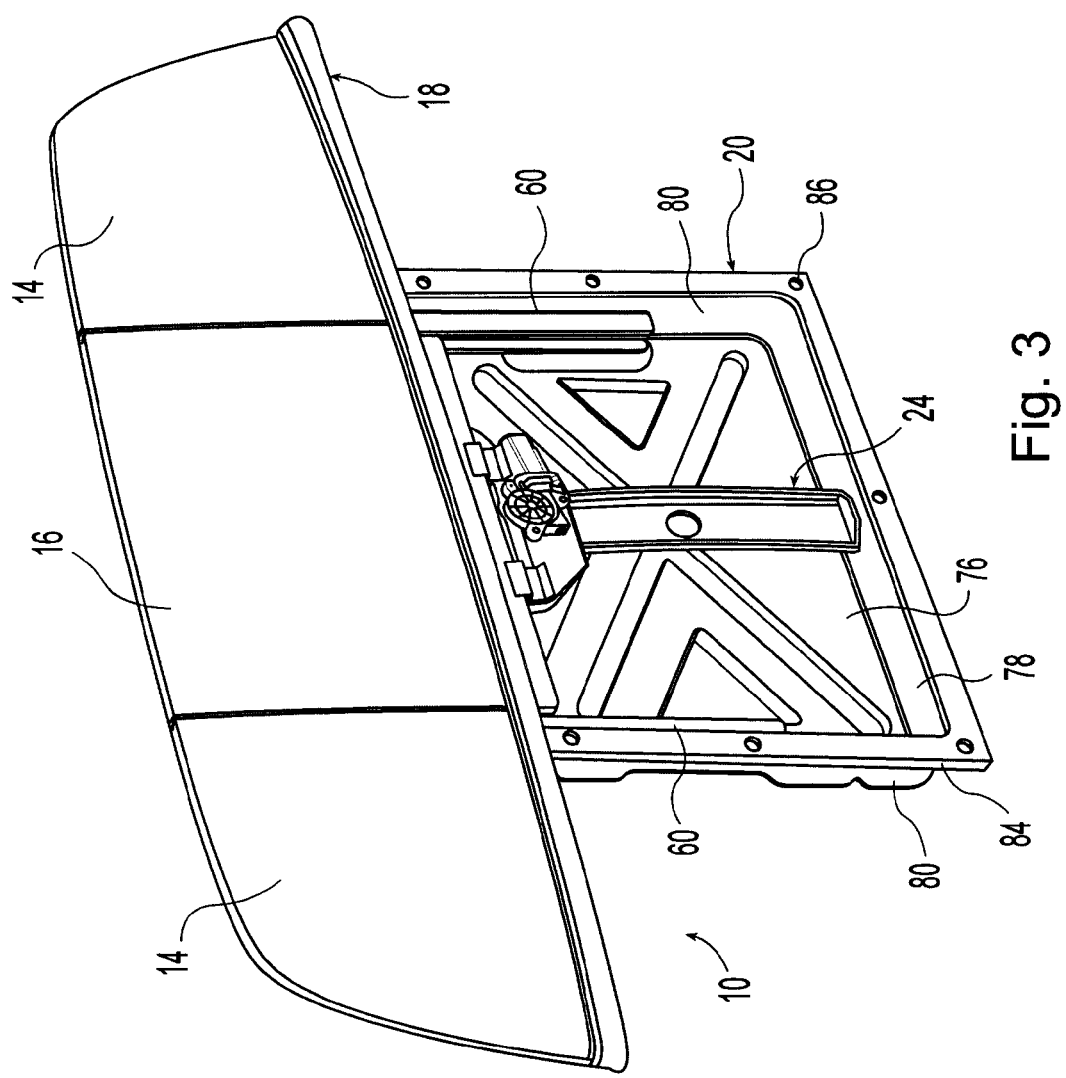
FIG. 3 is a perspective view of the window assembly of FIGS. 1 and 2.

As best shown in FIGS. 1 and 2, the illustrated moving glazing panel 16 and the mounting frame 20 are sized to allow accessibility to the vehicle body panel 38 for attaching seat belts or other hardware. Both lateral sides of the vehicle body panel 38, that is, portions of the vehicle body panel 38 located laterally outward of the mounting frame 20, are completely unobstructed by the window assembly 10.

From the foregoing disclosure it will be apparent that the mounting frame 20 can be secured to the window frame 18 prior to mounting the window assembly 10 to the vehicle 12. Thus, the present invention provides a window assembly 10 that is modular in form so that the window assembly 10 can be assembled and thoroughly tested prior to mounting to the vehicle 12. It is also apparent that the window assembly 10 mounts to a single vehicle sheet metal panel 38 and can be mounted to the vehicle 12 entirely from outside the passenger compartment through the rear opening. It is further apparent that the window assembly 10 manages any water that gets through the sealing system. It is moreover apparent that the window assembly 10 provides an appearance enhancement by providing flush mounting and/or exposed edges.

From the foregoing disclosure and detailed description of certain preferred embodiments, it will be apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A dropping glass window assembly for mounting to a vehicle body panel comprising, in combination:
    at least one stationary glazing panel;
    wherein the at least one stationary glazing panel has an outer surface, an inner surface, and a peripheral edge;
    at least one moving glazing panel movable between a closed position located adjacent the at least one stationary glazing panel and an open position located at least partially below the closed position to form an opening adjacent the at least one stationary glazing panel;
    wherein the at least one moving glazing panel has an outer surface, an inner surface and a peripheral edge;
    a drive mechanism including an electric motor and operably connected to the at least one moving glazing panel to selectively move the at least one moving glazing panel between the closed position and the open position;
    a window frame supporting the at least one stationary glazing panel for mounting the at least one stationary glazing panel to the vehicle;
    a mounting frame located at least partially below the at least one moving glazing panel when in the closed position and having an inner wall, a bottom wall rearwardly extending from a bottom of the inner wall, and side walls rearwardly extending from lateral sides of the inner wall forming a sealed interior space between the inner wall and the vehicle body panel when the bottom wall and the side walls are secured to the vehicle body panel to enclose the at least one moving glazing panel when in the open position and an open top for passage of the at least one moving glazing panel therethrough when moving between the open and closed positions;
    wherein the mounting frame is configured to capture water entering past the at least one moving glazing panel and to direct said water to at least one drain located in the bottom wall of the mounting frame; and
    wherein the mounting frame supports the drive mechanism and encloses the drive mechanism including the electric motor within the sealed interior space.

2. The dropping glass window assembly according to claim 1, wherein the drive mechanism includes a rack and pinion system.

3. The dropping glass window assembly according to claim 1, wherein the drive mechanism includes a drum and cable system.

4. The dropping glass window assembly according to claim 1, wherein the drive mechanism includes an arm and sector system.

5. The dropping glass window assembly according to claim 1, wherein the at least drain is located centrally between the side walls.

6. The dropping glass window assembly according to claim 5, wherein the bottom wall slopes downward toward the at least one drain to direct water thereto.

7. The dropping glass window assembly according to claim 1, wherein the mounting frame is bonded to the vehicle.

8. The dropping glass window assembly according to claim 1, wherein the mounting frame is attached to the vehicle with mechanical fasteners.

9. The dropping glass window assembly according to claim 1, wherein the mounting frame is attached to the vehicle with a water-tight seal.

10. The dropping glass window assembly according to claim 1, wherein the at least one drain aligns with a drain of the vehicle.

11. The dropping glass window assembly according to claim 1, wherein the window frame is formed separate from the stationary glazing and is bonded to the stationary glazing panel.

12. The dropping glass window assembly according to claim 1, wherein the window frame is molded directly onto the stationary glazing panel.

13. The dropping glass window assembly according to claim 1, wherein there are at least two of the at least one stationary glazing panel and the window frame connects the at least two stationary glazing panels.

14. The dropping glass window assembly according to claim 1, wherein the mounting frame is secured to the window frame prior to mounting the window assembly to the vehicle.

15. The dropping glass window assembly according to claim 1, wherein adjacent portions of the peripheral edges of the stationary glazing panel and the moving glazing panel are separated only by an air gap.

16. The dropping glass window assembly according to claim 1, wherein the moving glazing panel and the mounting frame are sized to allow accessibility to vehicle rear sheet metal for attaching seat belts or other hardware.

17. A dropping glass window assembly for mounting to a vehicle comprising, in combination:
    at least one stationary glazing panel;
    wherein the at least one stationary glazing panel has an outer surface, an inner surface, and a peripheral edge;
    at least one moving glazing panel movable between a closed position located adjacent the at least one stationary glazing panel and an open position located at least partially below the closed position to form an opening adjacent the at least one stationary glazing panel;
    wherein the at least one moving glazing panel has an outer surface, an inner surface and a peripheral edge;
    a drive mechanism operably connected to the at least one moving glazing panel to selectively move the at least one moving glazing panel between the closed position and the open position;
    a window frame supporting the at least one stationary glazing panel for mounting the at least one stationary glazing panel to the vehicle;
    wherein the window frame engages only the inner surface of the at least one stationary glazing panel so that the peripheral edge of the at least one stationary glazing panel can be flush mounted to the vehicle;

wherein the window frame has at least one rail secured to the at least one stationary glazing panel for guiding the moving glazing panel;

wherein the outer surfaces of the stationary glazing panel and the moving glazing panel are flush to each other and adjacent portions of the peripheral edges of the stationary glazing panel and the moving glazing panel are separated by an air gap;

a seal member secured to the window frame and having a bulb engaging the inner surfaces of the stationary glazing panel and the moving glazing panel when the moving glazing panel is in the closed position and extending only partially into the gap between the stationary glazing panel and the moving glazing panel to seal the gap;

at least one guide member secured to the moving glazing panels and engaging only the inner surface of the moving glazing panel; and wherein the guide member has a flange received in the rail so that the flange slides within the rail during movement of the moving glazing panel and a seal guide that supports and guides the seal member as the guide member slides along the seal member as the moving glazing panel moves between the closed position and the open position.

18. The dropping glass window assembly according to claim 17, further comprising a mounting frame located at least partially below the at least one moving glazing panel when in the closed position and having an inner wall, a bottom wall rearwardly extending from a bottom of the inner wall, and side walls rearwardly extending from lateral sides of the inner wall forming an interior space to enclose the at least one moving glazing panel when in the open position and an open top for passage of the at least one moving glazing panel therethrough when moving between the open and closed positions, and wherein the mounting frame is configured to capture water entering past the at least one moving glazing panel and to direct said water to at least one drain located in the bottom wall.

19. The dropping glass window assembly according to claim 18, wherein the drive mechanism includes an electric motor and the mounting frame supports the drive mechanism and encloses the drive mechanism including the electric motor.

20. The dropping glass window assembly according to claim 18, wherein the mounting frame is bonded to the vehicle.

21. The dropping glass window assembly according to claim 18, wherein the mounting frame is attached to the vehicle with mechanical fasteners.

22. The dropping glass window assembly according to claim 18, wherein the mounting frame is attached to the vehicle with a water-tight seal.

23. The dropping glass window assembly according to claim 18, wherein the at least one drain aligns with a drain of the vehicle.

24. The dropping glass window assembly according to claim 18, wherein the mounting frame is secured to the window frame prior to mounting the window assembly to the vehicle.

25. The dropping glass window assembly according to claim 18, wherein the moving glazing panel and the mounting frame are sized to allow accessibility to vehicle rear sheet metal for attaching seat belts or other hardware.

26. The dropping glass window assembly according to claim 17, wherein the drive mechanism includes a rack and pinion system.

27. The dropping glass window assembly according to claim 17, wherein the drive mechanism includes a drum and cable system.

28. The dropping glass window assembly according to claim 17, wherein the drive mechanism includes an arm and sector system.

29. The dropping glass window assembly according to claim 17, wherein the drive mechanism is powered by an electric motor.

30. The dropping glass window assembly according to claim 29, wherein the electric motor is configured and controlled to provide anti-pinch protection.

31. The dropping glass window assembly according to claim 17, wherein the window frame is formed separate from the stationary glazing and is bonded to the stationary glazing panel.

32. The dropping glass window assembly according to claim 17, wherein the window frame is molded directly onto the stationary glazing panel.

33. The dropping glass window assembly according to claim 17, wherein there are at least two of the at least one stationary glazing panel and the window frame connects the at least two stationary glazing panels.

34. A dropping glass window assembly for mounting to a vehicle comprising, in combination:

at least one stationary glazing panel;

wherein the at least one stationary glazing panel has an outer surface, an inner surface, and a peripheral edge;

at least one moving glazing panel movable between a closed position located adjacent the at least one stationary glazing panel and an open position located at least partially below the closed position to form an opening adjacent the at least one stationary glazing panel;

wherein the at least one moving glazing panel has an outer surface, an inner surface and a peripheral edge;

a drive mechanism operably connected to the at least one moving glazing panel to selectively move the at least one moving glazing panel between the closed position and the open position along a linear path;

a window frame supporting the at least one stationary glazing panel for mounting the at least one stationary glazing panel to the vehicle;

wherein the outer surfaces of the stationary glazing panel and the moving glazing panel are flush to each other and the window frame does not extend beyond the outside surface of the stationary glazing panel at a side portion of the peripheral edge of the stationary glazing panel;

a seal member secured to the window frame to engage the moving glazing panel when the moving glazing panel is in the closed position to seal the top of the moving glazing panel; and a trim member rearwardly spaced apart from the moving glazing panel and the seal member to provide an air gap between the trim member and the moving glazing panel which is visible from the rearward side of the moving glazing panel and positioned to visually cover a top portion of the peripheral edge of the moving glazing panel when the moving glazing panel is in the closed position and to visually cover the seal member.

35. The dropping glass window assembly according to claim 34, further comprising a mounting frame located at least partially below the at least one moving glazing panel when in the closed position and having an inner wall, a bottom wall rearwardly extending from a bottom of the inner wall, and side walls rearwardly extending from lateral sides of the inner wall forming an interior space to enclose the at least one moving glazing panel when in the open position and an open top for passage of the at least one moving glazing panel therethrough when moving between the open and closed positions, and wherein the mounting frame is configured to capture water entering past the at least one moving glazing panel and to direct said water to at least one drain located in the bottom wall.

36. The dropping glass window assembly according to claim 35, wherein the drive mechanism includes an electric motor and the mounting frame supports the drive mechanism and encloses the drive mechanism including the electric motor.

37. The dropping glass window assembly according to claim 35, wherein the mounting frame is bonded to the vehicle.

38. The dropping glass window assembly according to claim 35, wherein the mounting frame is attached to the vehicle with mechanical fasteners.

39. The dropping glass window assembly according to claim 35, wherein the mounting frame is attached to the vehicle with a water-tight seal.

40. The dropping glass window assembly according to claim 35, wherein the at least one drain aligns with a drain of the vehicle.

41. The dropping glass window assembly according to claim 35, wherein the mounting frame is secured to the window frame prior to mounting the window assembly to the vehicle.

42. The dropping glass window assembly according to claim 35, wherein the moving glazing panel and the mounting frame are sized to allow accessibility to vehicle rear sheet metal for attaching seat belts or other hardware.

43. The dropping glass window assembly according to claim 34, wherein the drive mechanism includes a rack and pinion system.

44. The dropping glass window assembly according to claim 34, wherein the drive mechanism includes a drum and cable system.

45. The dropping glass window assembly according to claim 34, wherein the drive mechanism includes an arm and sector system.

46. The dropping glass window assembly according to claim 34, wherein the drive mechanism is powered by an electric motor.

47. The dropping glass window assembly according to claim 46, wherein the electric motor is configured and controlled to provide anti-pinch protection.

48. The dropping glass window assembly according to claim 34, wherein the window frame is formed separate from the stationary glazing and is bonded to the stationary glazing panel.

49. The dropping glass window assembly according to claim 34, wherein the window frame is molded directly onto the stationary glazing panel.

50. The dropping glass window assembly according to claim 34, wherein there are at least two of the at least one stationary glazing panel and the window frame connects the at least two stationary glazing panels.

51. The dropping glass window assembly according to claim 34, wherein adjacent portions of the peripheral edges of the stationary glazing panel and the moving glazing panel are separated only by an air gap.

52. The dropping glass window assembly according to claim 34, wherein at least a top portion and a side portion of the peripheral edge of the stationary glazing panel are exposed.

53. The dropping glass window assembly according to claim 34, wherein the seal member includes a first bulb portion engaging the inner surface of the moving glazing panel and a second bulb portion engaging a top peripheral edge of the moving glazing pane.

* * * * *